(12) United States Patent
Hartwich

(10) Patent No.: US 9,825,852 B2
(45) Date of Patent: Nov. 21, 2017

(54) METHOD AND DEVICE FOR SERIAL DATA TRANSMISSION WHICH IS ADAPTED TO MEMORY SIZES

(75) Inventor: Florian Hartwich, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 759 days.

(21) Appl. No.: 14/114,161

(22) PCT Filed: Apr. 26, 2012

(86) PCT No.: PCT/EP2012/057593
§ 371 (c)(1),
(2), (4) Date: Jan. 13, 2014

(87) PCT Pub. No.: WO2012/146631
PCT Pub. Date: Nov. 1, 2012

(65) Prior Publication Data
US 2014/0156887 A1    Jun. 5, 2014

(30) Foreign Application Priority Data

Apr. 26, 2011 (DE) .......................... 10 2011 017 539
Jun. 29, 2011 (DE) .......................... 10 2011 078 266
Aug. 5, 2011 (DE) .......................... 10 2011 080 476

(51) Int. Cl.
*H04L 12/741*    (2013.01)
*G06F 13/42*    (2006.01)
(Continued)

(52) U.S. Cl.
CPC .............. *H04L 45/74* (2013.01); *G06F 5/065* (2013.01); *G06F 13/4282* (2013.01);
(Continued)

(58) Field of Classification Search
None
See application file for complete search history.

(56) References Cited

U.S. PATENT DOCUMENTS 5,448,561 A    9/1995 Kaiser et al.
5,559,963 A    9/1996 Gregg et al.
(Continued)

FOREIGN PATENT DOCUMENTS

CN    1433543 A    7/2003
CN    1534422 A    10/2004
(Continued)

OTHER PUBLICATIONS

Vieweg, F., et al, "Bosch Kraftfahrtechnisches Handbuch", 27th Edition, 2011, pp. 852-862, 1074-1084 and 1086-1119.
(Continued)

*Primary Examiner* — Henry Tsai
*Assistant Examiner* — Christopher Bartels
(74) *Attorney, Agent, or Firm* — Norton Rose Fulbright US LLP; Gerard Messina

(57) ABSTRACT

A method is described for serial data transmission in a bus system having at least two participating data processing units, the data processing units exchanging messages via the bus, the sent messages having a logical structure in accordance with CAN standard ISO 11898-1. When a first changeover condition is present, then, deviating from CAN, the data field of the messages can include more than eight bytes, the values of the data length code being interpreted, given the presence of the first changeover condition to determine the size of the data field. For forwarding data between the data field and the application software, at least one buffer memory is provided, and, if the size of the data field differs from the size of the buffer memory used, the forwarded quantity of data is adapted at least corresponding to the difference in size between the data field and the buffer memory.

30 Claims, 7 Drawing Sheets

(51) Int. Cl.
*H04L 12/40* (2006.01)
*H04L 12/413* (2006.01)
*G06F 5/06* (2006.01)

(52) U.S. Cl.
CPC .... *H04L 12/40013* (2013.01); *H04L 12/4135* (2013.01); *H04L 2012/40215* (2013.01)

(56) References Cited

U.S. PATENT DOCUMENTS

| | | | |
|---|---|---|---|
| 5,610,945 A | 3/1997 | Gregg et al. | |
| 5,734,826 A | 3/1998 | Olnowich | |
| 5,748,923 A | 5/1998 | Eitrich | |
| 6,088,342 A | 7/2000 | Cheng et al. | |
| 6,145,024 A | 11/2000 | Maezawa et al. | |
| 6,606,670 B1 | 8/2003 | Stoneking et al. | |
| 7,100,196 B2 * | 8/2006 | Fredriksson | G05B 19/042 709/208 |
| 7,103,688 B2 * | 9/2006 | Strong | H04L 1/0002 709/233 |
| 7,168,024 B2 | 1/2007 | Farnsworth | |
| 7,181,668 B2 | 2/2007 | Ahmed et al. | |
| 7,188,207 B2 | 3/2007 | Mitter | |
| 7,330,918 B2 | 2/2008 | Yamamoto et al. | |
| 7,430,261 B2 * | 9/2008 | Forest | H03M 13/43 370/392 |
| 7,433,354 B2 | 10/2008 | Scherer et al. | |
| 7,512,827 B2 | 3/2009 | Steffan | |
| 7,594,226 B2 | 9/2009 | Stelzer et al. | |
| 7,599,377 B2 | 10/2009 | Jordan et al. | |
| 7,602,779 B2 | 10/2009 | Kato et al. | |
| 7,675,877 B2 | 3/2010 | Lee | |
| 7,693,086 B2 | 4/2010 | Honda | |
| 7,738,462 B2 | 6/2010 | Hwang | |
| 7,801,162 B2 * | 9/2010 | Jeon | H04L 12/66 370/402 |
| 8,324,868 B2 | 12/2012 | Choi et al. | |
| 8,351,785 B2 | 1/2013 | Luo et al. | |
| 8,352,809 B2 | 1/2013 | Kabulepa et al. | |
| 8,375,217 B2 | 2/2013 | Schmidt | |
| 8,448,035 B2 | 5/2013 | Yamamoto et al. | |
| 8,509,257 B2 | 8/2013 | Yakashiro | |
| 8,560,125 B2 | 10/2013 | Wallaert et al. | |
| 8,705,527 B1 * | 4/2014 | Addepalli | H04W 4/046 370/389 |
| 8,774,210 B2 | 7/2014 | Grohman | |
| 9,032,124 B2 | 5/2015 | Elend | |
| 9,088,433 B2 | 7/2015 | Roettgermann et al. | |
| 9,091,551 B2 | 7/2015 | Hannah et al. | |
| 9,209,942 B2 | 12/2015 | Takada et al. | |
| 2004/0015603 A1 | 1/2004 | Griessbach et al. | |
| 2004/0228366 A1 * | 11/2004 | Fuehrer | H04L 1/0083 370/489 |
| 2005/0141565 A1 * | 6/2005 | Forest | H04J 3/0652 370/503 |
| 2005/0254518 A1 * | 11/2005 | Fujimori | H04L 69/08 370/466 |
| 2007/0091932 A1 | 4/2007 | Hwang | |
| 2007/0189323 A1 | 8/2007 | Swoboda et al. | |
| 2008/0274689 A1 * | 11/2008 | Kuban | H04L 1/16 455/7 |
| 2009/0192051 A1 | 7/2009 | Carman | |
| 2010/0106810 A1 * | 4/2010 | Grohman | B60H 1/00735 709/220 |
| 2010/0158045 A1 * | 6/2010 | Shin | H04L 12/40071 370/473 |
| 2011/0125940 A1 | 5/2011 | Aue et al. | |
| 2012/0233500 A1 * | 9/2012 | Roettgermann | G06F 11/3636 714/25 |
| 2012/0307836 A1 * | 12/2012 | Ishigooka | H04L 12/4625 370/401 |
| 2013/0166800 A1 | 6/2013 | Bosse et al. | |
| 2014/0334300 A1 | 11/2014 | Horihata et al. | |

FOREIGN PATENT DOCUMENTS

| | | |
|---|---|---|
| CN | 1860742 A | 11/2006 |
| CN | 101018179 A | 8/2007 |
| CN | 101057295 A | 10/2007 |
| CN | 101208674 A | 6/2008 |
| CN | 101572641 A | 11/2009 |
| CN | 101814230 A | 8/2010 |
| CN | 101873299 A | 10/2010 |
| CN | 101884196 A | 11/2010 |
| DE | 103 11 395 | 9/2004 |
| DE | 10 2004 055 684 A1 | 5/2006 |
| DE | 10 2007 051 657 | 4/2009 |
| JP | 2001339412 A | 12/2001 |
| JP | 2010258990 A | 11/2010 |
| JP | 2010272971 A | 12/2010 |
| RU | 2 337 497 C2 | 10/2008 |
| TW | 200941974 A | 10/2009 |
| WO | 2013/000916 A1 | 1/2013 |

OTHER PUBLICATIONS

ISO 16845: Road Vehicles—Controller Area Network (CAN)—Conformance Test Plan, 2004.
ISO 11898-1-5: Road Vehicles—Controller Area Network (CAN)—Part 5: High-speed Medium Access Unit with Low-power Mode, 2007.
International Search Report, PCT International Application No. PCT/EP2013/057593, dated Sep. 24, 2012.
Cena G et al.: "Overclocking of controller area network", Electronics Letters, IEE Stevenage, GB, vol. 35, No. 22, Oct. 28, 1999 (Oct. 28, 1999), pp. 1923-1925, XP006012867, ISSN: 0013-5194, DOI: 10.1049/EL:19991289.
International Standard ISO 11898-1:2003 Road Vehicles—Controller area network (CAN)—Part 1: Data link layer and physical signaling, (2003) pp. 1-52.
International Standard ISO 11898-1:2003/Cor.1:2006 Road Vehicles—Controller area network (CAN)—Part 1: Data link layer and physical signaling, (2006) pp. 1-6.
International Standard ISO 11898-2:2003 Road Vehicles—Controller area network (CAN)—Part 2: High-speed medium access unit, (2003), pp. 1-21.
International Standard ISO 11898-3:2006 Road Vehicles—Controller area network (CAN)—Part 3: Low-speed, fault-tolerant, medium-dependent interface, (2006), pp. 1-2.
International Standard ISO 11898-4:2004 Road Vehicles—Controller area network (CAN)—Part 4: Time-triggered ximmunication, (2004), pp. 1-32.
Unruh, et al. "Error Detection Analysis of Automotive Communication Protocols" SAE transactions 99.6, (1990) pp. 376-985, Detroit, USA.

* cited by examiner

Standard Format

Extended Format

SOF = Start Of Frame
RTR = Remote Transmission Request
SRR = Substitute Remote Request
IDE = Identifier Extension Bit Standard Format Extended Format

| DLC | Norm CAN | DLC 1 | DLC 2 | DLC 3 |
|---|---|---|---|---|
| 0000 | 0 (not used) | 0 (not used) | 16 | 0 |
| 0001 | 1 | 1 | 1 | 1 |
| 0010 | 2 | 2 | 2 | 2 |
| 0011 | 3 | 3 | 3 | 3 |
| 0100 | 4 | 4 | 4 | 4 |
| 0101 | 5 | 5 | 5 | 5 |
| 0110 | 6 | 6 | 6 | 6 |
| 0111 | 7 | 7 | 7 | 7 |
| 1000 | 8 | 8 | 8 | 8 |
| 1001 | 8 | 9 | 9 | 12 |
| 1010 | 8 | 10 | 10 | 16 |
| 1011 | 8 | 11 | 11 | 20 |
| 1100 | 8 | 12 | 12 | 24 |
| 1101 | 8 | 13 | 13 | 32 |
| 1110 | 8 | 14 | 14 | 48 |
| 1111 | 8 | 15 | 15 | 64 |

Fig. 2

Standard Format

Extended Format

Message (Standard Format)

Standard Format CAN FD „Fast"

Extended Format CAN FD „Fast"

METHOD AND DEVICE FOR SERIAL DATA TRANSMISSION WHICH IS ADAPTED TO MEMORY SIZES

FIELD

The present invention relates to a method and to a device for serial data transmission, adapted to memory sizes, between at least two participants in a serial bus system.

BACKGROUND INFORMATION

The standards of the family ISO 11898-1 through -5 describe the Controller Area Network (CAN), as well as an expansion of CAN referred to as Time-Triggered CAN (TTCAN). The standards are also referred to below as the CAN standard. The media access control method used in CAN is based on a bitwise arbitration. In the bitwise arbitration, a plurality of participating stations can simultaneously transmit data via the channel of the bus system without thereby disturbing the data transmission. In addition, during the transmission of a bit via the channel the participating stations can determine the logical state (0 or 1) of the channel. If a value of the sent bit does not correspond to the determined logical state of the channel, the participating station then terminates access to the channel. In CAN, the bitwise arbitration is standardly carried out on the basis of an identifier contained in a message that is to be transmitted via the channel. After a participating station has completely transmitted the identifier on the channel, it knows that it has exclusive access to the channel. Thus, the end of the transmission of the identifier corresponds to a beginning of a clearance interval within which the participating station can use the channel exclusively. According to the protocol specification of CAN, other participating stations may not access the channel, i.e., transmit data on the channel, until the transmitting participating station has transmitted a checksum field (CRC field) of the message. Thus, an end time point of the transmission of the CRC field corresponds to an end of the clearance interval.

Thus, through the bitwise arbitration a disturbance-free transmission via the channel is achieved of the message that has obtained the arbitration method. The protocols of CAN are suitable in particular for the transmission of short messages under real-time conditions, such that, through suitable assignment of the identifier, it can be ensured that particularly important messages almost always obtain the arbitration and are successfully transmitted.

With the increasing networking of modern vehicles and the introduction of additional systems for improving, for example, driver safety or driver comfort, the demands become greater on the quantities of data that are to be transmitted and on the latency times that are permissible during transmission. Examples include driving dynamics regulating systems, such as the electronic stability program ESP, driver assistance systems, such as automatic distance regulation ACC, or driver information systems such as traffic sign recognition (see, for example, the descriptions in "Bosch Kraftfahrtechnisches Handbuch," $27^{th}$ ed., 2011, Vieweg+Tuebner).

German Patent Application No. DE 103 11 395 A1 describes a system in which asynchronous serial communication can alternatively take place via an asymmetrical physical CAN protocol or via the symmetrical physical CAN protocol, and in this way a higher data transmission rate or data transmission security is achievable for the asynchronous communication.

German Patent Application No. DE 10 2007 051 657 A1 describes the use, in the exclusive time windows of the TTCAN protocol, of an asynchronous, fast, non-CAN-conforming data transmission in order to increase the transmitted data quantity.

In "Overclocking of controller area networks" (Electronics Letters, vol. 35, no. 22 (1999), page 1924, G. Cena and A. Valenzano address the effects of an overclocking of the bus frequency in sub-regions of the messages on the effectively achieved data rate.

SUMMARY

Below, the present invention and some of its advantages are described on the basis of figures and exemplary embodiments. The subject matter of the present invention is not limited to the presented and described exemplary embodiments.

In accordance with the present invention, messages having a logical structure according to CAN standard ISO 11898-1 are transmitted in a bus system having at least two participating data processing units, the logical structure including a start-of-frame bit, an arbitration field, a control field, a data field, a CRC field, an acknowledge field, and an end-of-frame sequence, and the control field including a data length code that contains an item of information about the length of the data field.

In accordance with the present invention, an example method is provided that is distinguished in that, deviating from CAN standard ISO 11898-1, the data field of messages can include more than eight bytes, the value of the four bits of the data length code being interpreted in a manner deviating at least partly from CAN standard ISO 11898-1 in order to determine the size of the data field, and that for the forwarding of data between the data field and the application software, at least one buffer memory is provided for use, and, if the size of the data field differs from the size of the buffer memory used, the forwarded quantity of data is adapted at least corresponding to the size difference between the data field and the buffer memory used. In this way, the advantage is achieved that the application software can continue to be used in unmodified fashion, and the size of the communication controller need not be unnecessarily increased, even if the size of the data field may be increased in comparison with the CAN standard.

Advantageously, from the data field of a message received via the bus, a data quantity corresponding to the size of the buffer memory used, in particular including eight bytes, is selected according to a specified or specifiable selection method, and is forwarded to the buffer memory if the size of the data field is larger than the size of the buffer memory used, typically eight bytes. In the data field of a message that is to be sent via the bus, the content of the buffer memory is entered into at least one specified or specifiable region of the data field of the message, and the remaining region or regions of the data field are filled according to a specified or specifiable method if the size of the data field is greater than the size of the buffer memory used. So that the message length does not increase unnecessarily, it is advantageous to fill the bits into the filled regions of the data field of a message to be sent via the bus in such a way that, according to the rules of CAN standard ISO 11898-1, no stuff bits need be inserted in these regions.

Through the setting up of an unambiguous allocation between the content of the data length code and the length of the data field, a high degree of flexibility is advantageously achieved with regard to the representable size of the data field.

In an advantageous embodiment of the example method, the enlargement of the data field and the adaptation of the interpretation of the content of the data length code take place as a function of a first changeover condition, so that when the first changeover condition is present the method according to the present invention is used, while otherwise the data transmission takes place in accordance with the normal CAN standard. Messages according to the example embodiment of the present invention can be distinguished from messages according to the CAN standard via an identifier in the arbitration field and/or in the control field. The identifier is evaluated in the participating data processing units in order to determine the first changeover condition, so that the receive process is adapted to the size of the data field as a function of the first changeover condition. In this way, an advantage is achieved that example devices according to the present invention can be used both in standard CAN bus systems and in new bus systems according to the present invention having potentially larger data fields.

In addition, it is possible, in the case in which the data field is enlarged in accordance with the present invention, to use a modified polynomial to calculate the checksum and to transmit it in the CRC field. This has the advantage that the reliability of the error recognition is maintained even for larger transmitted data quantities. In a particularly advantageous specific embodiment, at the beginning of a message a plurality of calculations of checksums are started in parallel, and, as a function of the presence of a (possibly the same) changeover condition, and/or of the content of the data length code, a decision is made as to which result of one of these calculations is used, or is transmitted in the CRC field. In this way, it is possible to send the information concerning whether a message is transmitted according to the method in accordance with the standard or in accordance with the modified method according to the present invention along with the message without informing the receiver ahead of time as to the method used. The checksums for checking the correct data transmission are present for both methods, and can be evaluated as needed.

If the example method is combined with a changeover of the bit length for example for the bits of the data field and of the CRC field, the further advantage is then achieved that a larger quantity of data can be transmitted in accelerated fashion, and the average data transmission rate of the bus system is increased. Here as well it may be advantageous to link the changeover to a changeover condition, and to provide the messages transmitted in modified fashion, having modified bit length, with a corresponding identifier.

The changeover conditions present in each case are communicated to the receivers by one or more identifiers. Here it is particularly advantageous if at least one of the identifiers takes place through a first identifier bit whose position is situated between the last bit of the identifier and the first bit of the data length code, and at whose position there is situated, in messages according to CAN standard ISO 11898-1, a bit having a defined value, in order to make it possible to use devices according to the present invention both in standard CAN bus systems and also in new bus systems according to the present invention.

The further identification via a further identifier bit (BRS) advantageously takes place via a bit situated between the first identifier bit and the first bit of the data length code.

In this way, the changeover of the bit length can take place independent of the changeover of the CRC calculation, or of the size of the data field, and it is possible to react in a flexible manner to particular conditions of the bus system.

For the understanding of the transmission method used in each case, it is advantageous to provide one or more additional status bits through which information relating to the data transmission method deviating from CAN standard ISO 11898-1 can be provided for the application software. For example, it would be possible to provide status bits in order to communicate the successful transmission, successful reception, or the type of error that most recently occurred. As a function of the frequency of the occurrence of errors in a data transmission method deviating from CAN standard ISO 11898-1, it is advantageously possible to switch back to the transmission method according to CAN standard ISO 11898-1 and to signal this using a further status bit.

In the message memory and/or buffer memory, one or more additional message bits can advantageously be provided that identify the method that is used, or that is to be used, for data transmission for the respective message. Here, for example the identifiers provided in the message can be entered.

The example method can advantageously be used in the normal operation of a motor vehicle for the transmission of data between at least two control devices of the motor vehicle connected via a suitable data bus. However, the example method is equally advantageously usable during manufacture or maintenance of a motor vehicle for the transmission of data between a programming unit connected to a suitable data bus for the purpose of programming and at least one control device of the motor vehicle connected to the data bus. The example method is likewise advantageously usable in industrial applications if larger quantities of data have to be transmitted, for example for control purposes. In particular when, due to the length of the transmission path during arbitration, a reduced data rate must be used so that all participants will have the possibility of obtaining access to the bus, the method can provide a higher data transmission rate, in particular in combination with the changeover of the length of the data field and the reduction of the bit length.

A further advantage is that a CAN standard controller need be modified only minimally in order to be able to operate in accordance with the present invention. A communication controller according to the present invention that can also operate as a CAN standard controller is only negligibly larger than a conventional CAN standard controller. The associated application program does not have to be modified, and advantages in the speed of the data transmission are already achieved.

Advantageously, significant parts of the CAN conformance test (ISO 16845) can be taken over. In an advantageous realization, the transmission method according to the present invention can be combined with supplementations of the TTCAN (ISO 11898-4).

BRIEF DESCRIPTION OF THE DRAWINGS

In the following, the present invention is explained in further detail below on the basis of the figures.

FIG. 2 shows various possibilities for interpreting the content of the data length code deviating in accordance with the present invention from CAN standard ISO 11898-1.

DETAILED DESCRIPTION OF EXAMPLE EMBODIMENTS

Figure 1A:
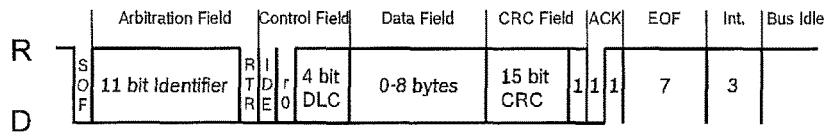
FIG. 1a shows two alternatives (standard/extended) for the structure of messages in the CAN format according to CAN standard ISO 11898-1.
Figure 1A:
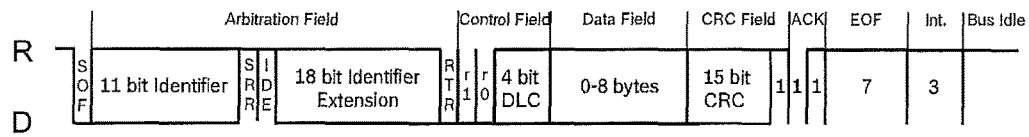

FIG. 1a shows the structure of messages as used on a CAN bus for data transmission. The two different formats, standard and extended, are shown. The example method according to the present invention can be applied to both formats in suitable specific embodiments.

The message begins with a start-of-frame (SOF) bit, which signals the beginning of the message. There follows a segment whose main purpose is to identify the message, and on the basis of which the participants of the bus system decide whether they will receive the message or not. This segment is referred to as the arbitration field, and contains the identifier. There follows a control field containing, inter alia, the data length code. The data length code contains information about the size of the data field of the message. There then follows the actual data field, which contains the data that is to be exchanged between the participants of the bus system. There follows the CRC field, having the checksum, which has 15 bits, and having a delimiter, followed by two acknowledge (ACK) bits, whose purpose is to signal the successful reception of a message to the sender. The message is terminated by an end-of-frame (EOF) sequence.

In the CAN transmission method according to the standard, the data field may contain a maximum of eight bytes, i.e., 64 bits of data. According to the standard, the data length code includes four bits, and can therefore assume 16 different values. From this range of values, in today's bus systems only eight different values are used for the different sizes of the data field, from one byte up to eight bytes. A data field of zero bytes is not recommended in the CAN standard, and sizes above eight bytes are not allowed. The assignment of the values of the data length code to the sizes of the data field is shown in FIG. 2, in the column "CAN standard."

Figure 1B:
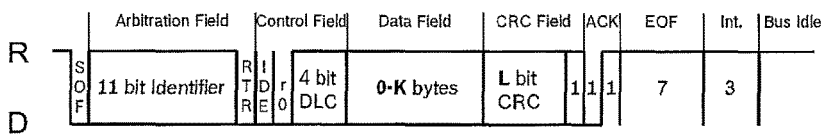
FIG. 1b shows two analogous alternatives for the format of the messages, modified in comparison thereto according to the present invention, in accordance with an exemplary embodiment of the present invention.
Figure 1B:
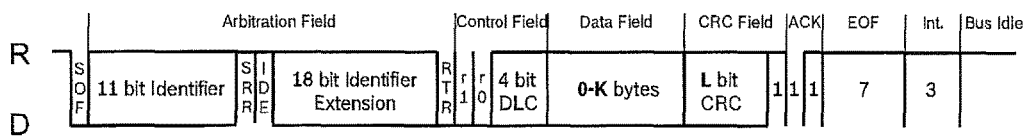

FIG. 1b shows, in an analogous representation and in comparison, the modified messages that are to be transmitted in accordance with an example embodiment of the present invention, derived in each case from the two standard formats.

In the transmission method modified according to an example embodiment of the present invention, the data field may also contain more than eight bytes; namely, in the version shown it may contain up to K bytes. Differing from the CAN standard, additional values that the data length code can assume are used to identify larger data fields. For example, the four bits of the data length code can be used to represent the values from 0 to 15 bytes. However, other allocations can also be made; for example, it is possible to use the data length code DLC=0b0000, which is not standardly used in today's CAN messages, for a further possible size of the data field, for example for the size 16 bytes.

These two possibilities are shown in FIG. 2 in table form, as DLC 1 and DLC 2. In these cases, the maximum size of data field K has the value 15 or 16. A further possibility is that, for the values of the data length code larger than 0b1000 and up to 0b1111, the associated sizes of the data field are increased by a larger increment. An example of this case is shown in the table as DLC 3. In this variant, the maximum size of data field K reaches the value 64 bytes. Of course, a different choice is also possible, for example an increment of four bytes in each case.

In order to ensure that a communication controller according to the present invention can determine the way in which it has to interpret the contents of the data length code, it is advantageous for it to automatically recognize whether the communication of the bus system is taking place according to the CAN standard or according to the example method of the present invention. A possibility for this is to use a reserved bit inside the arbitration field or inside the control field for identification, so that from this identifier the communication controller can derive a first changeover condition, as a function of which it selects the transmission method. For example, the second bit of the control field, designated r0 in FIG. 1b, can be used for the identification.

The determination can also be chosen as a function of the identifier format. For standard addressing, in this way a possibility for identifying the messages according to the present invention is the insertion of a recessive EDL (extended data length) bit into the control field at the position of the r0 bit, which is always dominant in the CAN standard. For extended addressing, the recessive EDL bit in the control field can occur at the position of the r1 bit, which is always dominant in the CAN standard.

Another possibility is to use the SRR bit, which in the CAN standard always has to be sent in recessive fashion, but which is also accepted in dominant fashion by the bus participants receiving the message. Bit combinations can also be evaluated for the determination of the first changeover condition.

A further possibility would be to specify the use of the extended format for the transmission method modified according to the present invention. Messages in the extended format are recognized by the bus participants via the value of the IDE bit (cf. FIG. 1a), and this bit can simultaneously represent the first changeover condition, so that the modified transmission method is always used for extended messages. Alternatively, it would also be possible in extended messages to use the reserved bit r1 for the identification or for the derivation of the first changeover condition. However, the reserved bit can also, as explained below, be used to derive a second changeover condition for changing over between more than two different sizes of the data field or allocations between values of the data length code and data field sizes.

Alternatively, however, it is also possible to apply the example method in communication controllers that are suitable for that purpose but are not also designed for communication according to the CAN standard. In this case, the determination of the named first changeover condition, for example as a function of a suitable identification of the messages, can be omitted. In this case, the communication controllers instead operate exclusively according to one of the described methods, and are correspondingly capable of being used only in bus systems in which only such communication controllers according to the present invention are being used.

If, as provided in the present invention, the data field of messages is enlarged, it can make sense also to adapt the method used for the cyclic redundancy check (CRC) in order to achieve adequate security against errors. In particular, it may be advantageous to use a different CRC polynomial, for example a higher-order one, and correspondingly to provide a CRC field having a different size in the messages modified according to the present invention. In FIG. 1b, this is shown in that the CRC field of the messages according to the present invention have, in the depicted example, a length of L bits, where L, deviating from the CAN standard, can be unequal, in particular can be greater than 15.

The use of a modified method for the calculation of the CRC checksum can be signaled to the bus participants by an identifier representing a third changeover condition.

This identifier and the third changeover condition can however also agree with the first identifier and/or changeover condition. Here as well, as described above, it is also possible for example to use the reserved bit r0 of FIG. 1b for the identification, or the SRR bit can be used. A use of the IDE bit in connection with the use of the method in extended messages, or also of the r1 bit, is also possible.

In the CAN standard controllers, the CRC code of CAN messages that are to be sent is produced by a feedback shift register at whose input the serially transmitted bits of the message are fed in sequentially. The width of the shift register corresponds to the order of the CRC polynomial. The CRC coding takes place through a linkage of the register contact with the CRC polynomial during the shift operations. When CAN messages are received, the serially received bits of the message are correspondingly shifted into the CRC shift register. The CRC test is successful if at the end of the CRC field all bits of the shift register are at zero. The CRC code generation in the case of transmission and the CRC test in the case of reception both take place in hardware without requiring a software intervention. A modification of the CRC coding therefore has no effect on the application software.

In a possible specific embodiment, the communication controller is realized in such a way that it is compatible with the CAN standard; i.e., it operates in a CAN standard bus system in a manner conforming to the standard, while in a bus system modified according to the present invention, on the one hand the controller permits larger data fields in the messages, and on the other hand it also carries out the modified calculation and checking of the CRC code.

Because, at the beginning of the reception of a message, it is not yet determined whether a CAN message conforming to the standard, or a message modified according to the present invention, is being received, in a communication controller according to the present invention two CRC shift registers are implemented that operate in parallel. After the reception of the CRC delimiter, if the CRC code is evaluated in the receiver, due to the identifier according to the present invention, or due to the third changeover condition derived for example from the identifier or from the content of the data length code, it is also determined which transmission method was used, and the shift register assigned to this transmission method is then evaluated. As explained above, the third changeover condition can agree with the first changeover condition, which relates to the size of the data field and the interpretation of the data length code.

At the beginning of the sending of a message, for the sender it is indeed already determined which transmission method is to be used for the transmission. However, because it can occur that the arbitration about the bus access is lost and the started message is not sent, and instead a different message is received, here as well both CRC shift registers are controlled in parallel.

The described implementation of two CRC shift registers operating in parallel also enables a further improvement: the CRC polynomial of the CAN standard protocol ($x15+x14+x10+x8+x7+x4+x3+1$) is designed for a message length of fewer than 127 bits. If messages transmitted according to the present invention also use longer data fields, then in order to maintain transmission security it makes sense to use a different, in particular longer, CRC polynomial. The messages communicated according to the present invention are correspondingly provided with a modified, in particular longer, CRC field. During operation, the communication controllers change dynamically between the two CRC shift registers, i.e., the shift register in accordance with the CAN standard and the shift register according to the present invention, in order to use the appropriate polynomial in each case.

It is also possible to use more than two shift registers, and correspondingly more than two CRC polynomials, in stepped fashion, as a function of the length of the data field or of the desired transmission security. In this case, if compatibility with the CAN standard is to be maintained, the corresponding identifier and the changeover condition associated therewith must be modified. For example, using the reserved bit r0 or the SRR bit in FIG. 1b a first changeover condition could be triggered that identifies a changeover to longer data fields, for example according to DLC 1 in FIG. 2, and an associated second CRC polynomial. For messages in the extended format, a second changeover condition could additionally be triggered, for example by reserved bit r1 or by the IDE bit in FIG. 1b, identifying the changeover to a further set of data field sizes, for example DLC 3 of FIG. 2, and a third CRC polynomial.

In addition, it is also possible for the first changeover condition to change over to the possibility of longer data fields and the corresponding interpretation of the content of the data length code, for example via the reserved bit r0 or the SRR bit, and for the determination of the third changeover condition, and therewith the selection of the CRC polynomial that is to be evaluated for the CRC check, to then take place as a function of the content of the data length code. The third changeover condition can correspondingly also assume more than two values. For example, the data field sizes could be selected in accordance with DLC 3, i.e., could assume values between 0 and 64 bytes, and three CRC polynomials could then be calculated in parallel via suitable shift registers, for example the CRC standard polynomial for data fields up to 8 bytes, a second CRC polynomial for data fields up to 24 bytes, and a third CRC polynomial for data fields up to 64 bytes.

Figure 3:
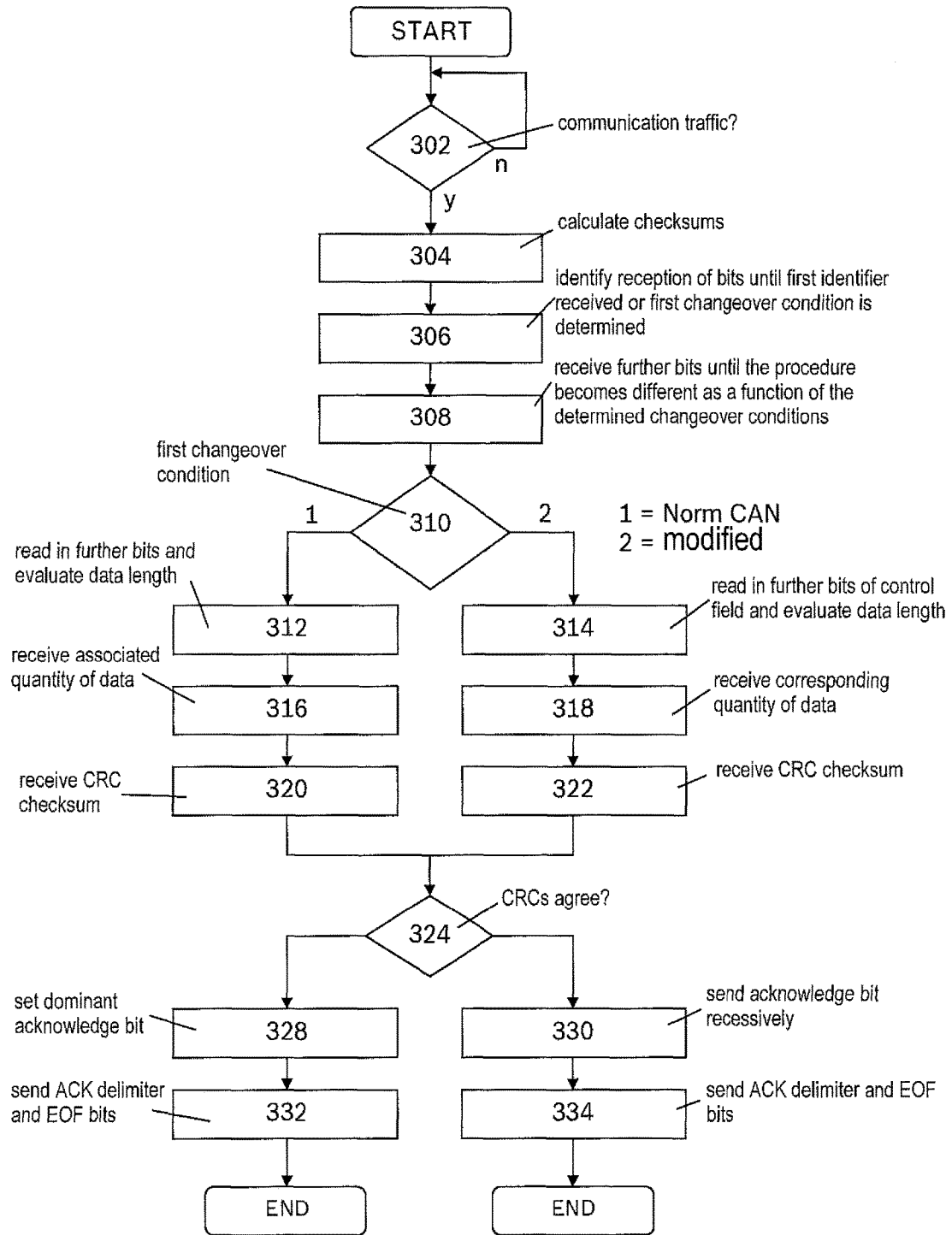
FIG. 3 schematically shows the receive process in accordance with the present invention at a participating station of the bus system according to an exemplary embodiment of the present invention.

FIG. 3 shows, in a simplified representation, a segment of the receive process according to an example embodiment of the present invention as it runs on a participating station of the bus system. Here, the case is shown in which compatibility with the CAN standard is achieved by adapting the behavior of the communication controller as a function of the first changeover condition. Although in FIG. 3 a representation has been selected that is standard for the description of program sequences in software, the method is completely suitable for hardware implementation.

The participant station is first in a state in which it scans the bus as long as no communication traffic prevails on the bus. Query 302 thus waits for a dominant bit on the bus. This bit identifies the beginning of a new message.

As soon as the beginning of a new message has been determined, in block 304 the calculation begins of the at least two checksums that are to be calculated in parallel. The first checksum corresponds to the CRC calculation of the CAN standard, while the second checksum is calculated according to the new method.

Next, beginning with step 306, the further bits of the message, following the SOF bit, are received, beginning with the arbitration field. If a plurality of bus participants wish to send a message, here negotiation takes place among the bus participants, according to the CAN standard method, as to which bus subscriber receives access to the bus. Depicted block 306 identifies the reception of all bits until the first identifier has been received, or the first changeover condition is determined. In the examples shown, the first changeover condition is determined from the arbitration field, for example from the SRR bit or from the IDE bit, or from the control field, for example from a reserved bit thereof (cf. FIG. 1). Subsequently, in block 308 further bits of the message can be received until, beginning from a particular bit of the message, the procedure becomes different as a function of the determined first changeover condition. This division into different ways of proceeding is ensured by a corresponding query or branching 310, as is shown in examples in the following.

If at branching 310, for example after the reception of the first two bits of the control field, the information is present that in accordance with the first changeover condition the communication is taking place according to the CAN standard (the path in FIG. 3 beginning with "1"), then in step 312 the further bits of the control field are read in. From these bits, the data length code is evaluated according to the CAN standard, and subsequently, in step 316, the associated quantity of data, a maximum of 8 bytes, corresponding to the data field, is received. If at branching 324 the information is present that the CRC checksum sent by the sender and the CRC checksum determined by the receiver itself agree with one another, then in block 328 a dominant acknowledge bit is set. It is to be noted that in this case the CRC checksum according to the standard is compared, because the communication is taking place according to the CAN standard. If agreement is not determined, then (block 330) the acknowledge bit is sent recessively. Subsequently, there follow the ACK delimiter and EOF bits (see FIG. 1b; not shown in FIG. 3).

If, in contrast, at branching 310, for example after reception of the first two bits of the control field, the information is present that, in accordance with the first changeover condition, the communication method modified according to the present invention is to be used (the path in FIG. 3 designated with "2"), then in block 314 the further bits of the control field are read in. From the result, the data length code is determined according to the new interpretation, of which some examples are shown in tabular fashion in FIG. 2. In block 318, the corresponding quantity of data is received, i.e., up to 15 bytes in the case of example DLC 1 from the table in FIG. 2, up to 16 bytes in example DLC 2, and up to 64 bytes in example DLC 3. In block 322, the CRC field that deviates according to the present invention, in particular being longer, is received. If at branching 324 the information is present that the CRC checksum sent by the sender and the CRC checksum determined by the receiver itself agree with one another, the comparison being based in this case on the CRC checksum deviating according to the present invention, then in block 328 a dominant acknowledge bit is sent. Otherwise (block 330), the acknowledgment is sent in recessive fashion. Subsequently, in step 332 or 334 respectively, there follow the ACK delimiter and the EOF bits. With this, a receive process for a message is terminated.

FIG. 3 shows the case in which the third changeover condition, which determines the CRC to be used, agrees with the first changeover condition relating to the size of the data field and the interpretation of the data length code. Thus, before reception 320, or 322, of the CRC checksums it was not again queried which CRC is to be received in accordance with the third changeover condition and to be evaluated for branching 324. This additional query can be incorporated into the sequence through a simple modification of the flow diagram of FIG. 3, as is shown in FIG. 4.

Figure 4:
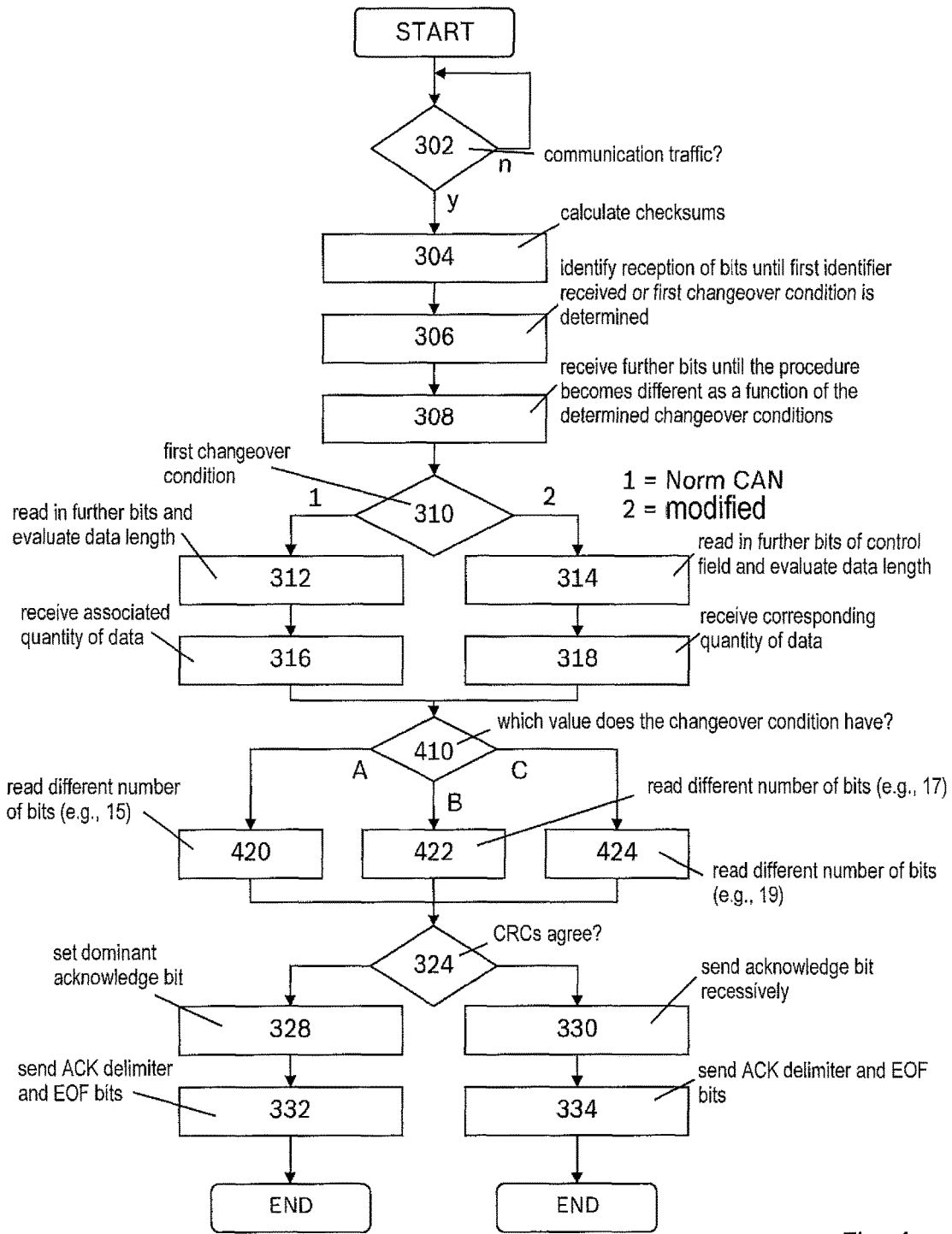
FIG. 4 schematically shows the receive process in accordance with the present invention at a participating station of the bus system according to a further exemplary embodiment of the present invention.

In the receive process, modified in this way, according to FIG. 4, after reception of the expected (according to the information from the data length code) number of data bytes of the data field in block 316 or 318, in the query or branching 410 it is determined which value the third changeover condition has. This information can, as described above, for example have been determined from the corresponding third identifier or from the content of the data length code. In the depicted example, there are three different values for the third changeover condition, namely A, B, and C. As a function of the value of the changeover condition, in block 420, 422, and 424 a different number of bits of the CRC field are then read in, for example 15 bits for value A, 17 bits for value B, and 19 bits for value C. Subsequently, at branching 324 a check takes place, analogous to FIG. 3, of whether the CRC checksum sent by the sender agrees with the CRC checksum determined by the receiver itself, and the procedure continues as a function thereof.

Figure 5:
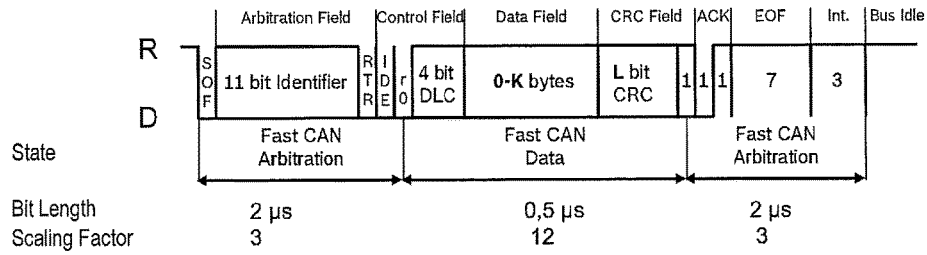
FIG. 5 shows, for an exemplary embodiment of the present invention, the format of messages modified in accordance with the present invention, in which a different bit length is used additionally in defined regions inside the message.
Figure 5:
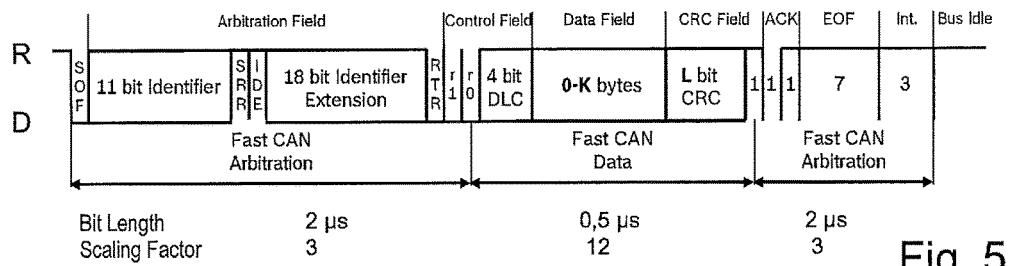

FIG. 5 again shows, for further exemplary embodiments of the transmission method according to the present invention, the structure of messages in the two possible variants, the standard format and the extended format. For both variants, in FIG. 5 regions are shown in which changeover takes place between two states, here designated fast CAN arbitration and fast CAN data. This changeover between the two states brings it about in this example that after termination of the arbitration for a part of the message, in particular for the data field and the CRC field, the bit lengths are shortened, and the individual bits are thus transmitted faster via the bus. In this way, the transmission time for a message can be shortened compared to the method according to the standard. The associated change of the temporal bit length can for example be realized by using at least two different scaling factors for the setting of the bus time unit relative to a smallest time unit or to the oscillator clock pulse in running operation. The changeover of the bit length, and the corresponding modification of the scaling factor, are also shown as examples in FIG. 5.

The transition between the states of fast CAN arbitration and fast CAN data can take place as a function of a further changeover condition that corresponds to an identifier of the messages that signals to the participants of the data transmission that the shortened bit length is being used. In the exemplary embodiment shown here, the selected position of this identifier is the reserved bit r0, transmitted before the data length code. It therefore corresponds to a possible position of the first identifier, which corresponds to the first changeover condition and identifies the possible use of longer data fields and of a modified interpretation of the data length code, and also corresponds to the third identifier, which corresponds to a modified CRC calculation.

Figure 7:
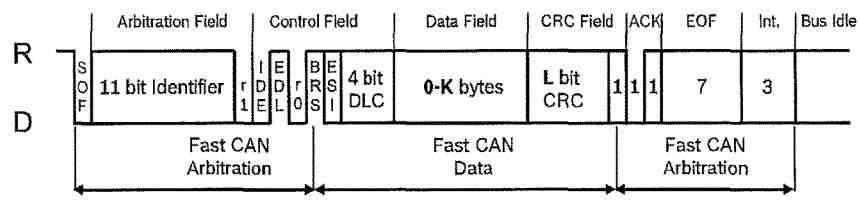
FIG. 7 shows two alternatives (standard/extended) for the format of the messages modified in accordance with the present invention according to a further exemplary embodiment of the present invention, in which separate bits are used for the changeover of data field size and bit length, and additional bits are also incorporated into the control field.
Figure 7:
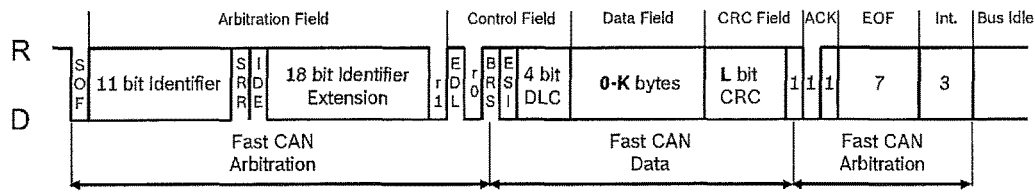

Another possibility for identifying the messages according to an example embodiment of the present invention having shortened bit length is shown in FIG. 7. Here the messages with potentially longer data fields (associated: first identifier) and modified CRC calculation (associated: third identifier) are identified by a recessive EDL (Extended Data Length) bit, which occurs at the position of a bit transmitted in dominant fashion in messages according to the CAN standard, and replaces this bit or shifts it by one position toward the rear. For standard addressing, the EDL bit occurs at the second position in the control field and shifts the r0 bit found there, which is always dominant, by one position. For the extended addressing, in the depicted example the EDL bit occurs at the first position of the control field, and replaces the reserved r1 bit located there, which in the CAN standard is always transmitted in dominant fashion. The fourth identifier, which indicates the use of the shortened bit length, is represented by the insertion of an additional, recessive BRS (Bit Rate Switch) bit into the control field of messages according to the present invention, identified by the EDL bit. In the exemplary embodiment shown here, the position of the BRS bit is the fourth (standard addressing) or third (extended addressing) position in the control field.

The messages have the designation "CAN FD Fast." For the two possible addressing variants of messages, the standard format and the extended format, in FIG. 7 regions are shown in which changeover takes place between two states, designated fast CAN arbitration and fast CAN data. This changeover between the two states brings it about, as already explained, that for the corresponding part of the message the bit lengths are shortened, and thus the individual bits are transmitted faster via the bus. In this way, the transmission time for a message can be shortened relative to the method according to the standard. The transition between the states fast CAN arbitration and fast CAN data takes place in messages that have the first or third identifier EDL, as a function of the further identifier BRS, which signals to the participants in the data transmission that the shortened bit length is being used.

In the depicted case, in which the first identifier EDL is followed by the second identifier BRS, in the transmission method according to the present invention messages are transmitted whose bit length is significantly shortened, and whose data field size can be expanded to values greater than 8 bytes, and whose CRC is adapted to the larger data field. In this way, a significant increase in the transmission capacity via the bus system is achieved with simultaneously improved transmission security.

In the depicted example, the faster transmission begins immediately after the sending of the associated identifier, and is terminated immediately after reaching the bit designated for the changeover back, or when a reason for starting an error frame has been recognized.

Figure 8:
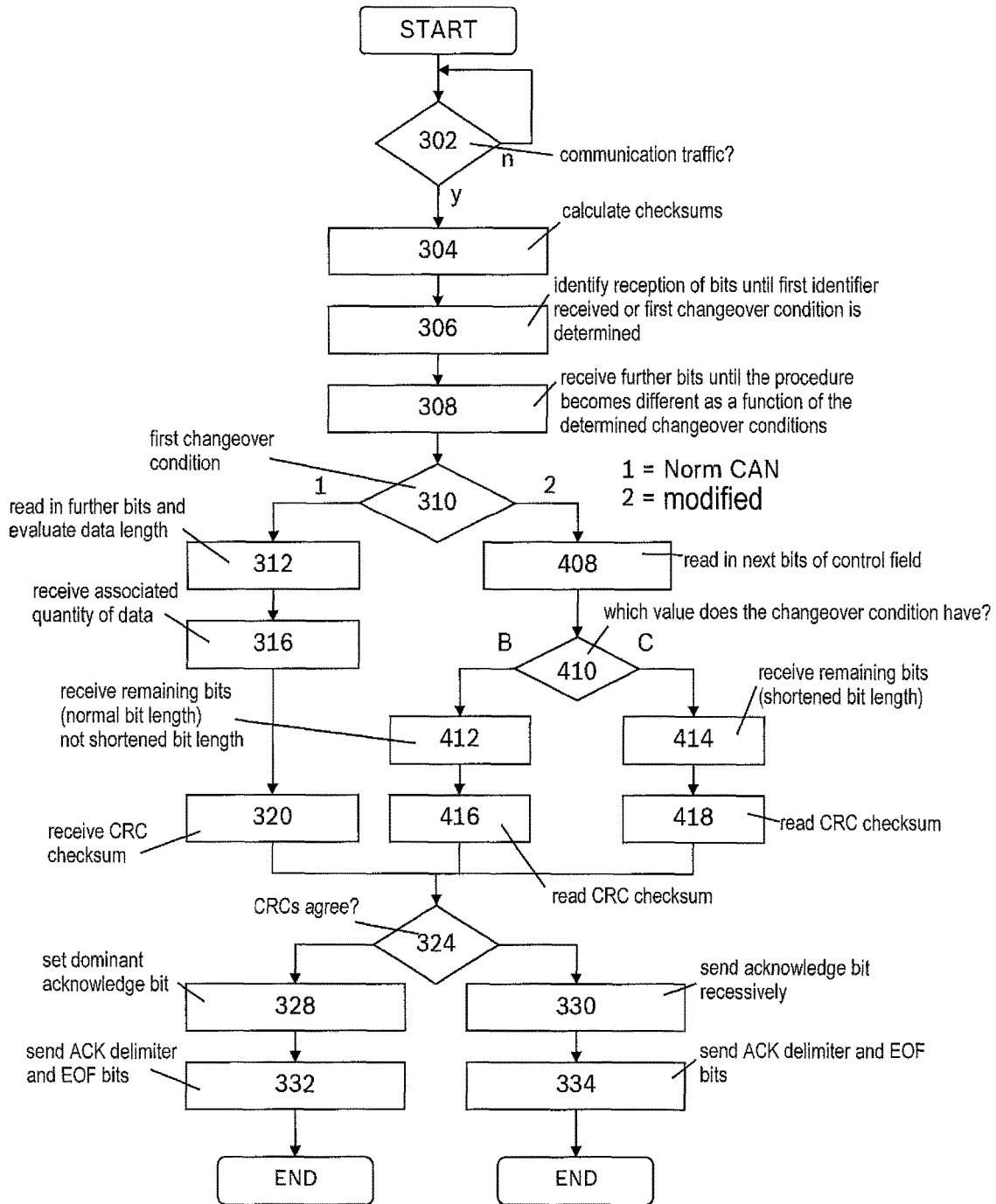
FIG. 8 shows the receive process adapted in accordance with the exemplary embodiment of the present invention, running on a participating station of the bus system.

FIG. 8 shows the receive process modified in comparison with FIG. 3, in which in addition, as a function of the second identifier BRS, a changeover takes place between the states fast CAN arbitration and fast CAN data. If at branching 310, for example after reception of the second bit of the control field as recessive bit EDL, the information is present that the communication method modified according to the present invention is to be used, then in block 408 the next bits of the control field are read in. If the bit acting as the second identifier, for example the fourth bit BRS of the control field expanded according to the present invention, is received with the provided value, for example in recessive fashion, then for example at the sample point of this bit the state fast CAN data is incorporated, i.e., a changeover takes place to the shortened bit length (path "C"). If the relevant bit has the converse value, i.e., in this example is dominant, then no shortening of the bit length takes place (path "B"). In block 412 or 414 there takes place the reception of the remaining bits of the control field including the data length code and the reception of the data field according to the size information from the data length code. In block 412 reception takes place with normal bit length, and in block 414 it takes place with the shortened bit length. In block 416 or 418, the CRC field that deviates according to the present invention, in particular being longer, is read in. At the last bit of the CRC field, the CRC delimiter, in block 418 changeover again takes place to the state fast CAN arbitration with the standard bit rate. Subsequently, at branching 324, analogous to FIG. 3, it is checked whether the CRC checksum sent by the sender agrees with the CRC checksum determined by the receiver itself, and the procedure continues further as a function thereof, as was already seen in FIG. 3.

The faster transmission begins for example immediately after the sending of the associated identifier, and is terminated immediately after reaching the bit designated for the changeover back, or when a reason for the start of an error frame has been recognized.

In normal operation of a motor vehicle, the method is suitable for the transmission of data between at least two control devices of the motor vehicle connected via a suitable data bus. However, it is equally advantageously usable during manufacture or maintenance of a motor vehicle for the transmission of data between a programming unit, connected to a suitable data bus for the purpose of programming, and at least one control device of the motor vehicle that is connected to the data bus. In addition, it is also possible for the method to be used in industrial automation, for example for the transmission of control information between distributed control units that are connected to one another through the bus and that control the sequence of an industrial manufacturing process. In this environment, very long bus lines can also occur, and it can be particularly advantageous to operate the bus system for the arbitration phase with a relatively long bit length, for example 16, 32, or 64 microseconds, so that the bus signals can be propagated over the entire bus system as required during the arbitration process. Subsequently, it is then possible to change over to shorter bit lengths for a part of the message as described so that the average transmission rate will not become too low.

Overall, the method represents a transmission method that is distinguished in that a CAN standard controller has to be modified only minimally in order to be capable of operating according to the present invention. A communication controller according to the present invention that can also operate as a CAN standard controller is only insignificantly larger than a conventional CAN standard controller. The associated application program does not have to be modified, and advantages are already achieved in the speed of the data transmission. Through the use of the expanded size of the data field and of the associated DLC and CRC, the speed of the data transmission can be further increased, and the adaptations in the application software are minimal. Large portions of the CAN conformance test (ISO 16845) can be incorporated. It is also possible to combine the transmission method according to the present invention with the supplementations of the TTCAN (ISO 11898-4).

At least for particular application purposes, or in an introductory phase, it makes sense for the data transmission method according to the present invention and the devices that carry it out to provide a variant that behaves completely or largely compatibly with the application software used. This application software can for example be the regulation software of an electronic stability program for motor vehicles, or can be the control software for an internal combustion engine of a motor vehicle. In particular for safety-critical systems, the application software is subject to extensive safeguarding programs, and it is therefore advantageous to be able to carry out the introduction of data transmission devices modified according to the present invention with unmodified application software.

The forwarding of data between the data field of a message and the application software takes place in communication controllers via a buffer memory provided for this use, which in the CAN standard has a specified size of, for example, eight bytes, and an associated message memory device. In the context of the present invention, the buffer memory and message memory can also refer to a region within a larger memory unit allocated for the corresponding use.

Correspondingly, in systems that carry out a data transmission according to the CAN standard, the application software exchanges data packets of at most eight bytes in size with the data field of CAN messages, via, in most cases, numerous message memory devices and buffer memory devices. If the application software remains unmodified, then the message memory and buffer memory can also be left at the specified size of for example eight bytes in order to avoid unnecessarily increasing the size, or chip surface, of the communication controller according to the present invention. If the size of the data field of a message according to the present invention (for example 16 bytes) differs from the size of the buffer memory used (for example eight bytes), it is necessary to adapt the protocol control unit of the communication controller corresponding to the difference in size between the data field and the buffer memory.

Figure 6:
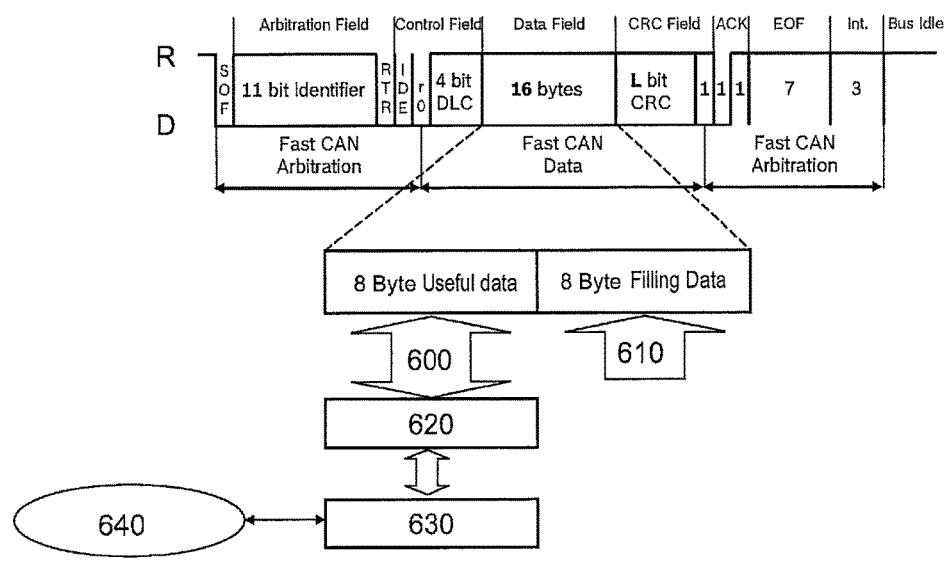
FIG. 6 shows an example of the adaptation in accordance with the present invention of the data quantity forwarded between the data field and the application software.

A further exemplary embodiment of the data transmission method of the present invention, illustrated in FIG. 6 for the example of a message in standard format having a data field 16 bytes in size, therefore provides that, with regard to the serial transmission of bits via the bus, the full functionality of the method is executed; however, only eight bytes of relevant useful data are transmitted in the data field. Therefore, while, given the corresponding presence of a change-over condition, for example a message having a data field 16 bytes in size and an associated identifier are transmitted via the bus, and the message is checked for correct transmission via a correspondingly adapted CRC polynomial, only eight bytes of useful data are handed over to application software 640 via buffer memory 620 and, for example, a message memory 630 in the communication controller according to the present invention. In the case of transmission, application software 640 writes eight bytes of useful data into buffer memory 620, for example via a further message memory 630 or the same message memory 630, these useful data being entered according to a specified or specifiable method into the data field, which is for example 16 bytes in size, of the message to be sent. Of course, it is also possible to limit the method to a size of the buffer memory differing from eight bytes, for example six or four bytes. This makes sense above all if the application software also provides this limitation. The selection of the size of the data field of 16 bytes is to be understood only as an example, and can for example also include values of 24, 32, or 64 bytes. Numerous other possibilities can be learned for example from FIG. 2. There is a relation between the quantity of data provided from the message to the application software, or provided by the application software for entry into the data field of the message, and the size of buffer memory 620.

In this exemplary embodiment, as symbolized in FIG. 6 by double arrow 600, during the serialization of the data that are to be transmitted the protocol control unit of the communication controller places for example the eight useful data bytes from buffer memory 620 into the first eight serial bytes of the data field, and, as shown in FIG. 6 by arrow 610, fills the further bits of the data field with specified, specifiable, or arbitrary filling data, for example with a particular bit pattern. It makes sense that here a bit sequence is used that does not result in an insertion of additional stuff bits according to the rules of CAN standard ISO 11898-1, because otherwise the data field would be enlarged unnecessarily. Thus, for example for each unused byte of the data field, a bit sequence 0b00110011 or 0b11001100 can be inserted.

It is also possible for the for example eight useful data bytes of buffer memory 620 to be entered not into the first eight bytes of the data field but rather at a different position, or in a plurality of different regions within the data field. The position of the useful data bytes need only be uniformly specified or specifiable for the bus participants.

The receiving bus participants read the message according to the method of the present invention, for example carry out the CRC test, and confirm the correct reception via acknowledge. The protocol control unit in the communication controller of the receiving bus participant converts the serially received bits of the message and extracts from the for example 16 bytes of the data field the eight bytes of useful data written to buffer memory 620. This is also symbolized in FIG. 6 by double arrow 600. The remaining filling data are discarded. Thus, only the eight bytes of useful data are handed over to application software 640 via buffer memory 620 and for example message memory 630. Application software 640 itself does not determine any difference in comparison with the use of the transmission method according to the standard.

Further supplementations are useful for the error-proof implementation of the various specific embodiments of the data transmission method according to the present invention, in particular the method having shortened bit length in sub-regions of the message, having modified length of the data field and modified interpretation, possibly in multiple stages, of the content of the data length code, with the use of different CRC checksums, or also with adaptation of the forwarded quantity of data to the difference in size between the data field and buffer memory.

Through suitable status registers, for example in the CAN standard it is ensured that the reaching of an error status (error warning, error passive, bus off) that occurs when there is a corresponding accumulation of errors in the data transmission can be read off for example by the microcontroller or the application software. In addition, successful transmit and receive processes are signaled by flags (TxOK, RxOK), and an item of information is kept ready concerning the respectively last bus event (LEC, Last Error Code). Some or all of this information can be held ready in multiple fashion in communication controllers according to the present invention, in storage regions provided for this purpose, so that for example through the associated microcontroller or the application software running thereon the respective information can be acquired separately and stored in accordance with the data transmission method currently being executed. In this way, it can be determined whether, given a transmission method that is modified relative to the CAN standard, for example having a longer data field or a shorter bit length in regions of the message, a particular error pattern occurs more often than is the case in the CAN standard transmission method.

An additional error status can be introduced and signaled by a status bit that, when there is an accumulation of errors in the modified transmission mode, switches the data transmission permanently back to the CAN standard transmission method. The items of information TxOK, RxOK, and LEC can be acquired separately for the various data transmission methods. Alternatively, for the LEC the information can additionally be stored indicating in which transmission mode the error occurred.

In addition, it can be useful to determine, for received messages, the method with which they were received and with which of the possible identifiers they were received, and, for messages that are to be sent, to determine individually according to which method they are to be sent and with which identifier they are to be sent. For this purpose, some or all receive message memory units and/or buffer memory units can be supplemented with a number of additional bits that correspond to the possible identifiers. It is also possible, in further bits provided for this purpose, to store the information separately concerning in which state, or under which changeover condition, the respective message was received. Analogously, some or all transmit message storage devices and/or buffer storage devices can be provided with additional bits in which it is entered that the respective message is to be sent using a modified method and/or with a corresponding identifier.

Finally, it can be useful to provide a communication controller according to the present invention in such a way that through a suitable reconfiguration it can be switched between the application software-compatible mode, with a limitation of the data quantity forwarded between the data field of the message and the application software to for example 8 bytes, and a data transmission-optimized mode, with use of the full size of the data field using a buffer memory designed to be correspondingly large. In this case, it is true that the corresponding savings in size or chip surface cannot be achieved through the use of a correspondingly smaller buffer memory and/or message memory, but the communication controller is capable of being used very flexibly both in bus participants that continue to use an existing application software and also in bus participants for which a new, data transmission-optimized software was created.

This communication controller capable of being switched over should then also make visible the mode currently being used, i.e., the application software-compatible mode or the data transmission-optimized mode, in a storage region provided for this purpose, for example using a corresponding status bit.

In the above description of the present invention, references to ISO standards are to be understood as referring to the version of the corresponding ISO standard valid at the time of the present application.

What is claimed is:

1. A method for serial data transmission in a bus system having at least two participating data processing units that exchange messages via the bus, sent messages having a logical structure in accordance with CAN standard ISO 11898-1, the logical structure including a start-of-frame bit, an arbitration field, a control field, a data field, a CRC field, an acknowledge field, and an end-of-frame sequence, the control field including a data length code that contains an item of information about the length of the data field, wherein given the presence of a first changeover condition, deviating from CAN standard ISO 11898-1, the data field of the messages can include more than eight bytes, at least one buffer memory being provided for forwarding of data between the data field and application software, the method comprising:

interpreting values of the data length code, in a manner deviating from CAN standard ISO 11898-1, to determine a size of the data field, when the first changeover condition is present; and if the size of the data field differs from the size of the buffer memory, adapting the data to be forwarded to the application software in a manner at least corresponding to the difference in size between the data field and the buffer memory.

2. The method as recited in claim 1, further comprising:
if the size of the data field is greater than the size of the buffer memory used, selecting from the data field of a message received via the bus a quantity of data corresponding to the size of the buffer memory according to a specified selection method, and forwarding the quantity of data to the buffer memory.

3. The method as recited in claim 1, further comprising:
entering contents of the buffer memory into at least one region of the data field of a message to be sent via the bus, and filling remaining regions of the data field according to a specified method if the size of the data field is greater than the size of the buffer memory used.

4. The method as recited in claim 1, wherein if the size of the data field of a message received via the bus is more than eight bytes, eight specified bytes of the data field are given to the application software via the at least one buffer memory.

5. The method as recited in claim 4, wherein if the size of the data field of a message to be sent via the bus is more than eight bytes, remaining bits of the data field are filled with specified values.

6. The method as recited in claim 5, wherein the bits in filled regions of the data field of a message to be sent via the bus are filled in such a way that, in accordance with the rules of CAN standard ISO 11898-1, no stuff bits need be inserted in these regions.

7. The method as recited in claim 6, wherein as a function of the value of the first changeover condition, each of possible value combinations of the four bits of the data length code is assigned to one of the allowable sizes of the data field.

8. The method as recited in claim 1, wherein the messages in which the data field includes more than eight bytes and the values of the data length code are interpreted in a manner deviating at least partly from CAN standard ISO 11898-1 to determine the size of the data field, are distinguished from messages conforming to the CAN standard through a first identifier in at least one of the arbitration field and the control field.

9. The method as recited in claim 8, wherein the first identifier is evaluated in the participating data processing units to determine the first changeover condition, so that a receive process is adapted to the size of the data field as a function of the first changeover condition.

10. The method as recited in claim 9, wherein a first identification takes place through a first identifier bit whose position is situated between the last bit of the first identifier and the first bit of the data length code, and at whose position there is situated, in messages according to CAN standard ISO 11898-1, a bit having a defined value.

11. The method as recited in claim 10, wherein, as a function of the value of a further changeover condition, a temporal bit length inside a message can assume at least two different values, the temporal bit length being, for at least one first specifiable region inside the message, greater than or equal to a specified minimum value of approximately one microsecond, and the temporal bit length having, in at least one second specifiable region inside the message, a value that is reduced in comparison with the first region.

12. The method as recited in claim 11, wherein the at least two different values of the temporal bit length within a message are realized through the use of at least two different scaling factors for setting a bus time unit relative to one of: i) a smallest time unit, or ii) an oscillator clock pulse in running operation.

13. The method as recited in claim 11, wherein the messages in which, as a function of the value of a further changeover condition, the temporal bit length inside a message can assume at least two different values, can be recognized via a further identifier in at least one of the arbitration field and in the control field.

14. The method as recited in claim 13, wherein the value of the further changeover condition in the participating data processing units one of: i) is determined as a function of the further identifier, ii) agrees with the first changeover condition, or iii) is derived from the first changeover condition, the receive process being adapted to the different values of the bit length inside a message as a function of the value of the further changeover condition.

15. The method as recited in claim 14, wherein a further identifier takes place through a further identifier bit situated between the first identifier bit and a first bit of the data length code.

16. The method as recited in claim 15, wherein at least one additional status bit is provided through which the application software is provided with information relating to the data transmission method deviating from CAN standard ISO 11898-1.

17. The method as recited in claim 16, wherein the at least one additional status bit includes at least one of: i) a status bit for communicating successful transmission, ii) a status bit for communicating successful reception, and iii) at least one status bit for communicating a type of the error that most recently occurred.

18. The method as recited in claim 17, wherein as a function of the frequency of occurrences of errors in a data transmission method deviating from CAN standard ISO 11898-1, a changeover takes place back to the transmission method according to CAN standard ISO 11898-1, and at least one status bit is provided for the communication of the change back that has taken place.

19. The method as recited in claim 18, wherein in at least one of: i) the at least one buffer memory, and ii) at least one associated message memory, at least one additional message bit is provided that identifies the method of data transmission to use for the respective message.

20. The method as recited in claim 19, wherein the at least one additional message bit corresponds to at least one of the values of the first identifier or further identifier or is derived from the values thereof, or corresponds to at least one of the values of bits r1 or r0 of the control field or SRR of the arbitration field.

21. The method as recited in claim 1, wherein as a function of the value of a changeover condition, the CRC field of messages can have at least two different numbers of bits, at least one of the valid numbers of bits in the CRC field being a number of bits deviating from CAN standard ISO 11898-1, a generator polynomial deviating from CAN standard ISO 11898-1 being used to determine contents of a CRC field having a deviating number of bits.

22. A device for serial data transmission in a bus system having at least two participating data processing units that exchange messages via the bus, the sent messages having a logical structure in accordance with CAN standard ISO 11898-1, the logical structure including a start-of-frame bit, an arbitration field, a control field, a data field, a CRC field, an acknowledge field, and an end-of-frame sequence, the control field including a data length code that contains an item of information about the length of the data field, wherein given the presence of a first changeover condition, deviating from CAN standard ISO 11898-1 the data field of the messages can include more than eight bytes, wherein the device is configured to interpret values of the data length code, when the first changeover condition is present, in a manner deviating from CAN standard ISO 11898-1 to determine the size of the data field, wherein the device includes at least one buffer memory for forwarding of data between the data field and application software, and wherein the device is configured to adapt a quantity of data to be forwarded to the application software in a manner at least corresponding to a difference in size between the data field and the buffer memory used if the size of the data field differs from the size of the buffer memory used.

23. The device as recited in claim 22, wherein the device is configured to select from the data field of a message received via the bus, a quantity corresponding to the size of the memory buffer according to a detection method, and to forward the quantity of data to the buffer memory of the size of the data field is greater than the size of the buffer memory.

24. The device as recited in claim 23, wherein the device further includes at least one protocol control unit to adapt the quantity of data forwarded between the data field and the buffer memory in a manner corresponding to the difference in size between the data field and the buffer memory.

25. The device as recited in claim 24, wherein the device includes at least one additional or expanded status register whose content identifies at least one of: i) a type, ii) a success, and iii) a result, of the respectively used data transmission method.

26. The device as recited in claim 25, wherein the device includes at least one of: i) an additional message memory, ii) an expanded message memory, and iii) a buffer memory, in which at least one additional message bit identifies the method of data transmission that is used for the respective message.

27. A method for serial data transmission in a bus system of a motor vehicle having at least two control devices that exchange messages, via the bus, sent messages having a logical structure in accordance with CAN standard ISO 11898-1, the logical structure including a start-of-frame bit, an arbitration field, a control field, a data field, a CRC field, an acknowledge field, and an end-of-frame sequence, the control field including a data length code that contains an item of information about the length of the data field, wherein given the presence of a first changeover condition, deviating from CAN standard ISO 11898-1, the data field of the messages can include more than eight bytes, at least one buffer memory being provided for forwarding of data between the data field and application software, the method comprising:
- interpreting values of the data length code, in a manner deviating from CAN standard ISO 11898-1, to determine a size of the data field, when the first changeover condition is present; and
- if the size of the data field differs from the size of the buffer memory, adapting the data to be forwarded to the application software in a manner at least corresponding to the difference in size between the data field and the buffer memory.

28. A method for serial data transmission in a bus system of an industrial installation having at least two control devices that exchange messages, via the bus, sent messages having a logical structure in accordance with CAN standard ISO 11898-1, the logical structure including a start-of-frame bit, an arbitration field, a control field, a data field, a CRC field, an acknowledge field, and an end-of-frame sequence, the control field including a data length code that contains an item of information about the length of the data field, wherein given the presence of a first changeover condition, deviating from CAN standard ISO 11898-1, the data field of the messages can include more than eight bytes, at least one buffer memory being provided for forwarding of data between the data field and application software, the method comprising:
- interpreting values of the data length code, in a manner deviating from CAN standard ISO 11898-1, to determine a size of the data field, when the first changeover condition is present; and
- if the size of the data field differs from the size of the buffer memory, adapting the data to be forwarded to the application software in a manner at least corresponding to the difference in size between the data field and the buffer memory.

29. A method for serial data transmission in a bus system of a motor vehicle, the bus system including a control device of the motor vehicle and a programming unit connected to the bus system for programming during manufacturing or maintenance of the motor vehicle, the control device and the programming unit exchanging messages via the bus, sent messages having a logical structure in accordance with CAN standard ISO 11898-1, the logical structure including a start-of-frame bit, an arbitration field, a control field, a data field, a CRC field, an acknowledge field, and an end-of-frame sequence, the control field including a data length code that contains an item of information about the length of the data field, wherein given the presence of a first changeover condition, deviating from CAN standard ISO 11898-1, the data field of the messages can include more than eight bytes, at least one buffer memory being provided for forwarding of data between the data field and application software, the method comprising:
- interpreting values of the data length code, in a manner deviating from CAN standard ISO 11898-1, to determine a size of the data field, when the first changeover condition is present; and
- if the size of the data field differs from the size of the buffer memory, adapting the data to be forwarded to the application software in a manner at least corresponding to the difference in size between the data field and the buffer memory.

30. A method for serial data transmission in a bus system of an industrial installation, the bus system including a control device of the industrial installation and a programming unit connected to the bus system for programming during manufacturing or maintenance of the industrial installation, the control device and the programming unit exchanging messages via the bus, sent messages having a logical structure in accordance with CAN standard ISO 11898-1, the logical structure including a start-of-frame bit, an arbitration field, a control field, a data field, a CRC field, an acknowledge field, and an end-of-frame sequence, the control field including a data length code that contains an item of information about the length of the data field, wherein given the presence of a first changeover condition, deviating from CAN standard ISO 11898-1, the data field of the messages can include more than eight bytes, at least one buffer memory being provided for forwarding of data between the data field and application software, the method comprising:
- interpreting values of the data length code, in a manner deviating from CAN standard ISO 11898-1, to determine a size of the data field, when the first changeover condition is present; and
- if the size of the data field differs from the size of the buffer memory, adapting the data to be forwarded to the application software in a manner at least corresponding to the difference in size between the data field and the buffer memory.

* * * * *